May 9, 1933. C. FAURE-ROUX 1,907,529
HOOK AND BALLOON EMPLOYING THE SAME
Filed April 21, 1932
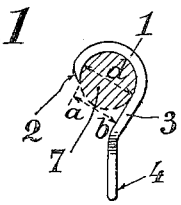
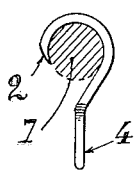
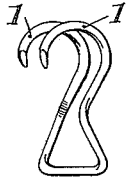
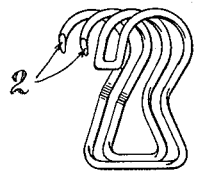
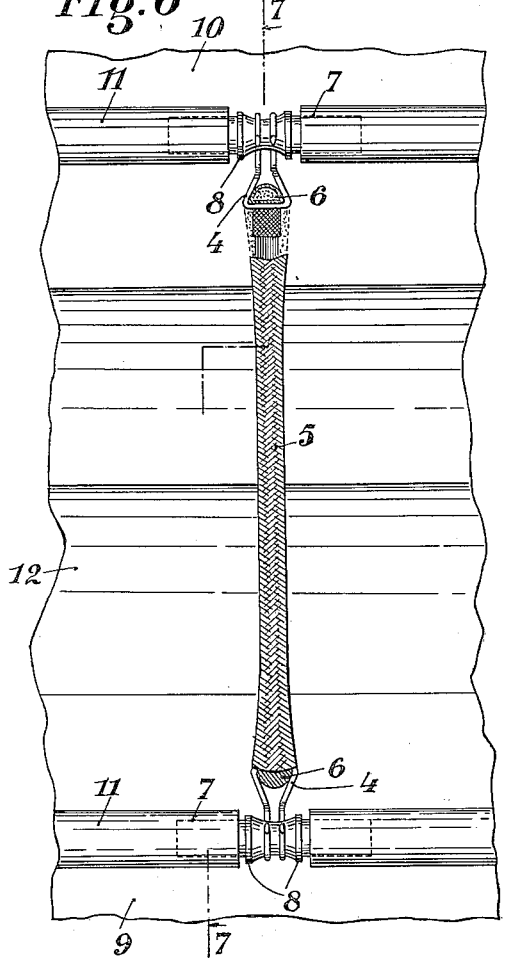
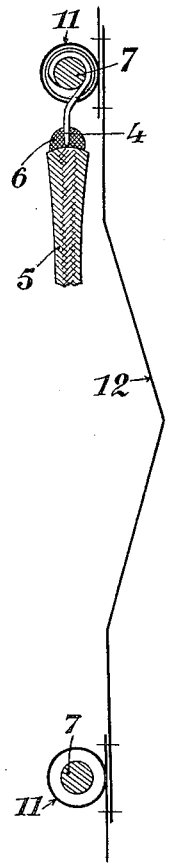
INVENTOR:
Charles Faure-Roux
By Kueje & Boyce
ATTORNEYS Patented May 9, 1933

1,907,529

UNITED STATES PATENT OFFICE

CHARLES FAURE-ROUX, OF ST.-CHAMOND, FRANCE, ASSIGNOR TO ETABLISSEMENTS CH. FAURE-ROUX, OF ST.-CHAMOND, FRANCE

HOOK AND BALLOON EMPLOYING THE SAME

Application filed April 21, 1932, Serial No. 606,593, and in France May 28, 1931.

The present invention relates to a hook which is chiefly characterized by the fact that it consists of a wire of resilient metal or of any other material which is somewhat resilient and that the space between the end of the curved portion of the hook and the main body of the latter is somewhat less than the diameter of the piece upon which the hook is to be engaged, this diameter being preferably equal to the diameter of the hook itself.

In this manner, the hook can only be attached to the said piece by reason of an instantaneous elastic distortion of the hook, and thus when the latter is placed in position it cannot escape from the said piece, but without requiring the use of any auxiliary fastening means.

The invention further relates to the different uses of the said hook, and chiefly for the extensible devices employed upon balloons and airships.

In the accompanying drawing, which is given by way of example:

Figs. 1 and 2 are respectively a front view and a perspective view of a simple form of hook in conformity to the invention.

Figs. 3 and 4 are analogous views of a double form of hook.

Fig. 5 is a perspective view of a hook having four juxtaposed branches.

Figs. 6 and 7 are respectively a front view and a section on the line 7—7 of Fig. 6, showing the use of a double hook mounted on an extensible device which is thus adapted to connect together two rods pertaining, for instance, to two respective parts of a balloon envelope.

In the form of construction shown in Figs. 1 and 2, the hook consists of a wire of steel (piano wire) or of any other resilient metal, or of fibre or other somewhat resilient material. The said wire is bent so as to form a curved portion 1. The space left between the end 2 of said portion and the main part 3 is somewhat less than the diameter $d$ of the piece to which the said hook is to be attached, and this diameter $d$ is preferably equal to that of the hook.

The end 2 of the hook is preferably cut on a bevel, so that it will correspond to the surface of the piece 7 of cylindrical or other shape to which the hook is attached, without forming an abrupt projection upon this surface. The other end of the hook is bent so as to form a loop 4 of any suitable form, by which the hook may be attached to the device to be connected.

It will be noted that in order that the hook may be mounted in place upon a rod or the like, or cylindrical shape, whose diameter is $d$, the hook part 1 must open in an elastic manner until the length $ab$ becomes equal to $d$. The hook then closes upon the piece 7, and it is thus attached to the latter in a very simple manner and without the use of any auxiliary fastening means.

Figs. 3 and 4 show another form of hook in which the elastic wire is bent so as to form two juxtaposed branches 1 and 1a, and thus the device will have double the strength. The two ends 2 are preferably cut on a bevel, as in the preceding case.

Obviously, the hook may comprise any suitable number of curved parts 1, and for instance four such parts, as shown in Fig. 5.

The said hooks may be used for a great variety of purposes. They may be employed for instance for mounting shock-absorbers upon aeroplanes with or without motor, upon seaplanes and other flying machines or for mounting extensible devices upon balloons and airships.

This last-mentioned use is shown in Figs. 6 and 7. Herein the extensible device 5 has a loop 6 at each end, in which are mounted two respective hooks according to the invention, by means of their curved portions 4. Each hook is engaged, at its outer part, with a rod 7 which has a diameter $d$ at its middle part. Two shoulders 8 prevent all movement of the hook along the said rod. Each rod 7 is held fast with reference to one of the two parts 9 or 10 of the envelope to be connected together, as it is contained in a rolled part 11.

The two halves 9 and 10 of the envelope are connected together by a part 12 which forms a bellows and assures leakless conditions for the envelope, while permitting relative displacements of these two halves under the action of the internal gas and against a set of parallel extensible devices of the same construction as the device 5, these being independent of one another and situated upon the whole or a part of the periphery of the envelope.

Each of the said extensible devices can be very rapidly put in place and removed, this being effected simply by the elastic distortion of the hooks, and hence the arrangement can be mounted much more readily and rapidly than the known arrangements, consisting of an elastic cord forming a ring which is passed around the two rods to be connected, the ends of the cord being joined together by binding.

On the other hand, since the end or ends of the hook 2 are cut on a bevel and thus correspond to the surface of the rods, this prevents said hook to catch the balloon envelope or the bellows 12 and said parts will not be damaged if they should rub against such ends of the hooks when the balloon is disinflated.

While I have disclosed what I deem to be preferred embodiments of my invention, it should be well understood that I do not wish to be limited thereto as there might be changes made in the arrangement, disposition and form of the parts without departing from the principle of my invention as comprehended within the scope of the appended claims.

Having now described my invention what I claim as new and desire to secure by Letters Patent is:

1. A fixation device comprising in combination a piece of substantially cylindrical shape and a hook consisting of an elastic wire having an end curved in the form of an open circular loop having its inner diameter substantially equal to the outer diameter of said piece and adapted to be engaged on said piece, the distance between the free end of said loop and the main body of the hook being less than said outer diameter of said piece, and said free end of said loop being cut on a bevel on its outer face in such manner that said bevel merges progressively in the outer periphery of said piece when in position on said piece.

2. In a balloon in combination an envelope formed of two parts to be connected together, a cylindrical rod on each part of said envelope, two shoulders on each rod, at least one extensible device disposed between the two rods, and at each end of said extensible device a hook consisting of an elastic wire having an end curved in the form of an open circular loop having its inner diameter substantially equal to the outer diameter of said rods between said shoulders and adapted to be engaged on either of said rods, the distance between the free end of said loop and the main body of the hook being less than said outer diameter of said rods, and said free end of said loop being cut on a bevel on its outer face in such manner that said bevel merges progressively in the outer periphery of said rod when in position on said rod.

In testimony whereof I have signed my name to this specification.

CHARLES FAURE-ROUX.